United States Patent

Ohkubo

[11] Patent Number: 6,128,676
[45] Date of Patent: *Oct. 3, 2000

[54] DMA CONTROL DEVICE AND RECORDING APPARATUS HAVING PRIORITY CONTROL CIRCUIT DYNAMICALLY CHANGES DEFINED PRIORITIES WITHIN PREDETERMINED TIME INTERVAL

[75] Inventor: Chikatoshi Ohkubo, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/597,254

[22] Filed: Feb. 6, 1996

[30] Foreign Application Priority Data

Feb. 6, 1995 [JP] Japan ................... 7-017855

[51] Int. Cl.⁷ .................................................. G06F 13/30
[52] U.S. Cl. ............................ 710/28; 710/41; 710/116; 358/1.15
[58] Field of Search ................................... 395/478, 848, 395/842, 861, 728, 729, 296; 710/25, 28, 41, 107, 116; 358/1.15

[56] References Cited

U.S. PATENT DOCUMENTS

| | | | |
|---|---|---|---|
| 4,122,520 | 10/1978 | Adamchick et al. | 395/845 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/107 R |
| 4,558,412 | 12/1985 | Inoshita et al. | 395/848 |
| 4,723,129 | 2/1988 | Endo et al. | 346/1.1 |
| 4,740,796 | 4/1988 | Endo et al. | 346/1.1 |
| 4,788,640 | 11/1988 | Hansen | 395/478 |
| 4,901,234 | 2/1990 | Heath et al. | 395/860 |
| 4,953,103 | 8/1990 | Suzuki | 395/115 |
| 4,959,782 | 9/1990 | Tulpule et al. | 395/728 |
| 4,987,529 | 1/1991 | Craft et al. | 364/200 |
| 5,043,918 | 8/1991 | Murahashi | 395/115 |
| 5,261,047 | 11/1993 | Rivshin | 395/163 |
| 5,301,283 | 4/1994 | Thacker et al. | 395/296 |
| 5,450,591 | 9/1995 | Palmer | 395/293 |
| 5,511,152 | 4/1996 | Lai et al. | 395/115 |

FOREIGN PATENT DOCUMENTS

| | | |
|---|---|---|
| 476990A3 | 3/1992 | European Pat. Off. . |
| 570146A1 | 11/1993 | European Pat. Off. . |
| 54-56847 | 3/1979 | Japan . |
| 59-123670 | 7/1984 | Japan . |
| 59-138464 | 8/1984 | Japan . |
| 60-71260 | 4/1985 | Japan . |
| WO9301565 | 1/1993 | WIPO . |

*Primary Examiner*—Dung C. Dinh
*Attorney, Agent, or Firm*—Fitzpatrick, Cella, Harper & Scinto

[57] ABSTRACT

A recording apparatus is disclosed that, in use, is connected with a host apparatus, receives recording information from the host apparatus by direct memory access ("DMA") and can print received recording information by using a recording head. A first memory access circuit receives recording information from the host apparatus by DMA. A second memory access circuit supplies received recording information to the recording head with a timing appropriate for recording, using DMA. A priority circuit controls the respective priorities assigned to various types of DMA to ensure that all types of DMA demands can be accommodated within an acceptable length of time.

34 Claims, 6 Drawing Sheets

DMA CONTROL DEVICE AND RECORDING APPARATUS HAVING PRIORITY CONTROL CIRCUIT DYNAMICALLY CHANGES DEFINED PRIORITIES WITHIN PREDETERMINED TIME INTERVAL

BACKGROUND OF THE INVENTION

1. Field of the Invention

This invention relates to a DMA (Direct Memory Access) control device and to a recording apparatus which transfers recording information using that device. More specifically, this invention relates to a recording apparatus which can perform DMA transfer within a predetermined time, when the recording apparatus has plural DMA circuits.

2. Description of Related Art

Recently, as personal computers, computer graphics and CAD (Computer Aided Design) have become more and more widely used, ever more rigorous demands have been made on printers. As a recording method, printers use various systems such as laser beam electrophotography, static photographic systems, lithographic recording, heat transfer recording, wire dot recording and inkjet recording.

Printing speeds become much higher year by year by means of improvements in the speed of processors, optimization of software algorithms and so on.

However, further improvements in printing speed are desirable, since burdensome processes such as a proportional font process of such as outline font or vector font are now more likely to be carried out by the printer than by the processor. In responding to this need, printer makers trying to improve printing speed have been concentrating on the hardware processes instead of on the software processes, which continue to be performed conventionally.

As an example, a DMA process during printing in a serial printer is given. This is a method that improves the processing speed so as to reduce the burden of software by directly accessing outside memory (e.g., buffer memory, or print memory) by an ASIC (Application Specific IC), etc., not through the CPU. The general control of such a DMA process will be explained referring to FIG. 5.

In FIG. 5, reference numeral 11 is a heat pulse generating section which generates a heat pulse that heats a recording head 16 at a predetermined timing corresponding to movement of the head 16. Reference numeral 12 is a heat control section which controls a head drive circuit 15 that receives the heat pulse from the heat pulse generating section 11 and drives the recording head 16. Reference numeral 13 is a RAM where actual printing data is stored successively in order; usually the RAM 13 stores the data in the order of the heat row heating. Reference numeral 14 is a DMA control section which reads the next heat data from the RAM 13 according to a control signal from the heat control section 12 and stores the read data in an inside register of heat control section 12. The head drive circuit drives the actual printing based on the heat data stored in the inner register of the heat control section 12 according to a control signal from the heat control section 12. The recording head 16 performs recording in response to a heat pulse (that is, the heat pulse produces the heating that results in ejection of the ink). Reference numeral 17 is a carriage which reciprocates the head 16 across the recording medium being printed on. Reference numeral 18 is a scanning section which controls this scanning movement of the carriage 17 in the main scanning direction (across the width of the recording medium, ordinarily).

Operation during printing will be explained for this circuit structure. When the carriage 17 carrying the head 16 begins a scan under control of the scanning section 18, the heat pulse generating section 11 initiates operation of an inner counter. The heat pulse generating section 11 sends the heat pulse to the heat control section 12, when it judges head 16 on carriage 17 has reached a heat start position (the position of the head may be tracked, for example, by incrementing or decrementing a counter as the head 16 moves). The heat control section 12 sends a DMA start signal to the DMA control section 14 upon receiving the heat pulse from the heat pulse generating section 11.

The DMA control section 14 reads out the heat data stored in RAM 13, stores the read-out heat data in the register inside the heat control section 12 and then increments the value of the pointer which indicates the address or location of heat data in RAM 13 to the location of the next heat data upon receiving each DMA start signal from the heat control section 12.

If heat data is stored in the inner register under control of the DMA control section 14, the heat control section 12 will output the heat start signal to the head drive circuit 15. The head drive circuit 15 actuates the printing mechanism of the head (e.g., ink ejection) at the proper times to print the heat data stored in the inner register of the heat control section 12, when it receives the heat start signal from the heat control section 12. The first dot is printed by means of this operation.

The heat pulse generating section 11 continues to operate the inner counter after generating the heat pulse for the first dot. The heat pulse generating section 11 generates a second heat pulse when the heat pulse generating section 11 judges that the carriage has reached the heat position for the second dot to be printed, based on the value in the counter, and the second dot is printed by a heat pulse in the same way. One line is printed by repetition of this operation.

In the foregoing explanation, an example of DMA control between the heat control section 12 and the memory (RAM 13) has been given. The DMA is not seldom used in refreshing control where a DRAM is used as a memory, for reception and transmission control in an interface, and so on. It is general to provide a DMA priority circuit in an apparatus which has plural DMA functions in this way to process DMA demands in an order determined by priority.

One conventional example of a priority decisional method used in such cases will now be explained. For example, it is usual that the priority of DMA control for heat control is high while that of DMA control for an interface is low, in a printing apparatus which performs both of these types of DMA control. For this reason, the following problem will occur if the priority of DMA control for the interface is set higher than the priority of DMA control for the heat control: If the printing apparatus is connected with a host that has a high-speed interface, DMA will be monopolized by interface receiving, and since reading out of the recording information by DMA in the heat control process requires a certain amount of time and thus is likely to be interfered with by the interface-related DMA, recording mistakes will occur.

Accordingly, since the priority of DMA for heat control is high and the priority of DMA for the interface is set low, when DMA demands crowd in on each other in rapid succession due to the demands of the heat control and so on, the host is controlled to wait, through negotiation with the interface.

To facilitate explanation of the problems encountered in the above-mentioned conventional technique, the Centronics® interface which is in general use as a parallel interface of a printer, will be mentioned as an example. Recently, interface standard IEEEP1284 (it will be simply called hereinafter "bidirectional Centronics"), which aims at bidirectionalizing a Centronics interface was announced. In the bidirectional Centronics standard, a maximum value "Max" of the response time within which a peripheral equipment must respond to a specific demand from a host is defined.

As mentioned above, in an interface where the Max value of response time is defined, when DMA demands are competing in a conventional DMA system using a conventional priority structure of DMA control, it happens that the host cannot respond within the time defined in the above-mentioned standard. On the other hand, if the priority of the DMA interface were raised in order to be able to respond within the time defined in the standard, the host computer, if it has a high-speed interface would hinder DMA of the heat control.

Therefore, the conventional DMA structure has been unable to support bidirectional Centronics standard perfectly, irrespective of priority structure.

SUMMARY OF THE INVENTION

One object of the invention is to provide a DMA control device and a recording apparatus which can perform plural DMA controls in appropriate timing.

It is another object of the invention to provide a recording apparatus which can send and receive recording information within a predetermined time, even though the sending and receiving of recording information is based on a bidirectional interface standard and is performed by DMA control.

It is another object of the invention to provide a recording apparatus which can perform sending and receiving of recording information by plural DMA controls smoothly.

According to one aspect of the invention there is provided a recording apparatus that, in use, is connected with a host apparatus, receives recording information from the host apparatus by direct memory access ("DMA") and can print received recording information by using a recording head. A first memory access means receives recording information from the host apparatus by DMA. A second memory access means supplies received recording information to the recording head with a timing appropriate for recording, using DMA. A memory access control means controls the respective priorities assigned to various types of DMA to ensure that all types of DMA demands can be accommodated within an acceptable length of time. The recording apparatus is very well adapted for use with an ink jet recording system, although it is not limited to use with that type of system but may utilize any suitable recording mechanism.

According to another aspect of the invention there is provided a DMA controller for controlling access data to memory, in which first and second memory access means access data using DMA responsive to first and second access demands, and a memory access control means controls the respective priorities assigned to various types of DMA to ensure that all types of DMA demands can be accommodated within an acceptable length of time.

According to the invention, priorities of plural types of DMA are not fixed unchangeably, but can be changed upon occurrence of specified conditions. Accordingly, even though sending and receiving of recording information based on the bidirectional interface standard is performed by DMA control, that standard can be satisfied.

The foregoing and other objects, features and advantages of the invention will be appreciated more fully from a consideration of the following description of the preferred embodiments, taken in conjunction with the accompanying drawings.

DETAILED DESCRIPTION OF THE PREFERRED EMBODIMENTS

The preferred embodiments of the present invention will now be described with reference to the drawings. An example of the recording apparatus which adopts bidirectional Centronics DMA is given in the following explanation. However, an important feature of the present invention is the structure that can change priority order according to conditions, and the invention is not limited to bidirectional Centronics DMA (or any other particular standard), or to a recording apparatus.

<Summary Explanation of Apparatus Body>

Figure 1:
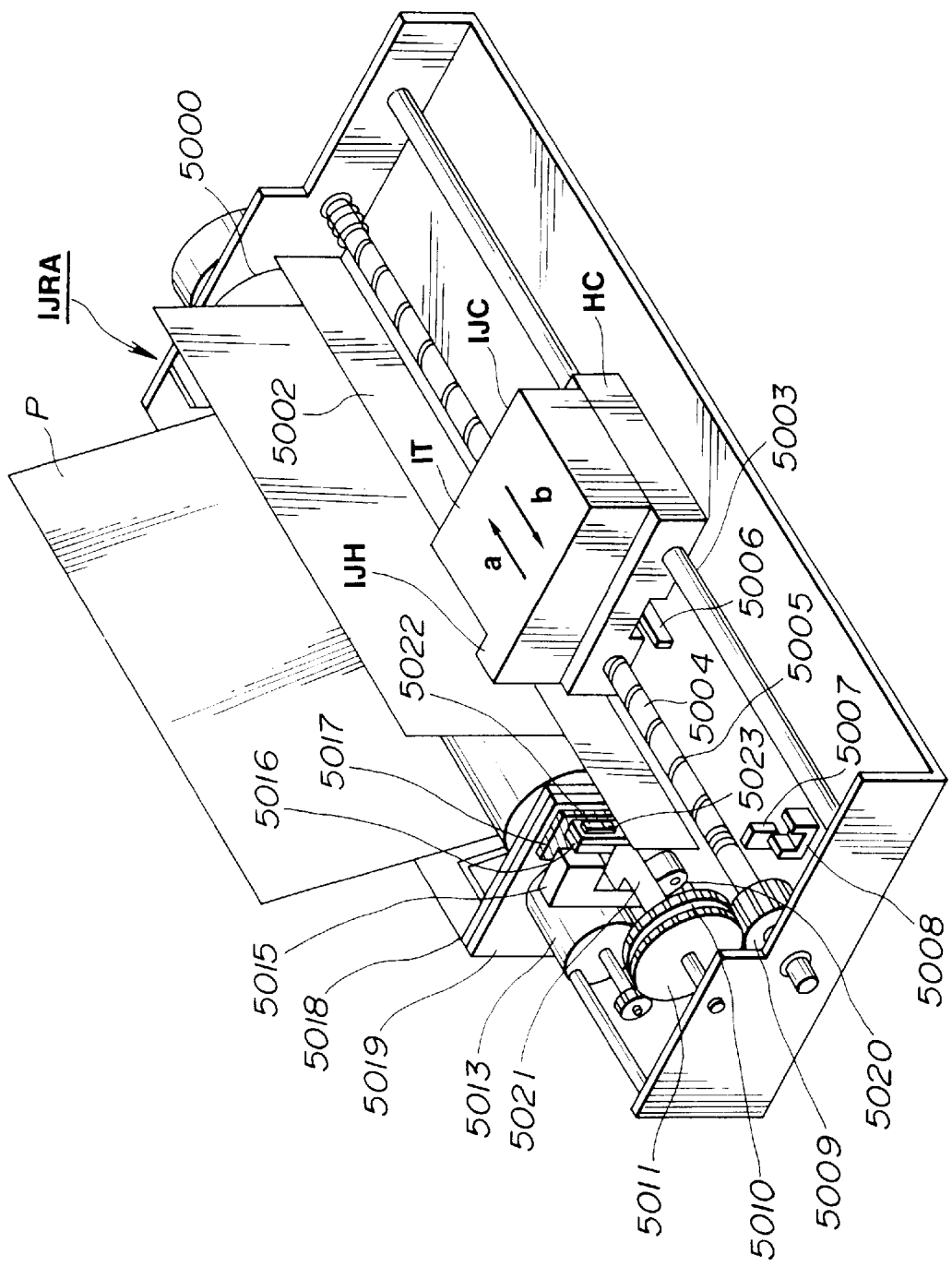
FIG. 1 is a perspective view showing structure of an ink jet recording apparatus ("IJRA") to which the present invention can be applied.

FIG. 1 is a perspective view showing an ink jet recording apparatus (IJRA) to which the present invention can be applied. Referring to FIG. 1, a carriage HC engages a spiral groove 5004 of a lead screw 5005, which is, through rotational-force transmission gears 5011 and 5009, rotated in synchronization with forward/reverse rotations of a drive motor 5013. The carriage HC has a pin (not shown) by means of which the carriage HC is reciprocated in the directions indicated by arrows a and b. The carriage HC has an ink jet cartridge IJC mounted thereon. Reference numeral 5002 represents a paper retaining plate which presses paper against a platen 5000 in the direction, in which the carriage HC is moved. Reference numerals 5007 and 5008 represent a photocouple to serve as a home position detecting means which checks for the presence of a lever 5006 on the carriage HC in the region between them in order, for example, to switch the rotational direction of the motor 5013. Reference numeral 5016 represents a member for controlling a capping member 5022 which caps the overall surface of the recording head. Reference numeral 5015 represents a suction means for sucking the inside portion of the capping member 5022, the suction means 5015 being arranged to recover the sucking performance of the recording head through an opening 5023 in the capping member 5022. Reference numeral 5017 represents a cleaning blade which is enabled to move forward/rearward by a member 5019. Reference numeral 5018 represents a support so integrally formed with the body of the ink jet recording apparatus to support the cleaning blade 5017 and the member 5019. (It is needless to say that the blade is not limited to what is shown in this figure, and that one can instead apply any suitable known cleaning blade to this embodiment.) Reference numeral 5021 represents a lever for starting the sucking operation for suction recovery, the lever 5021 being moved by a cam 5020 on the carriage HC as the carriage is moved into and out of its home position. The drive force of the drive motor 5013 is used to control the movement of the carriage HC via a known transmission means, such as a clutch means.

The foregoing capping, cleaning and suction recovery operation can be performed at corresponding positions by the operation of a lead screw 5005 when the carriage HC has been brought to the home position region. The foregoing operations are performed at a known timing.

<Explanation of control structure>

Figure 2:
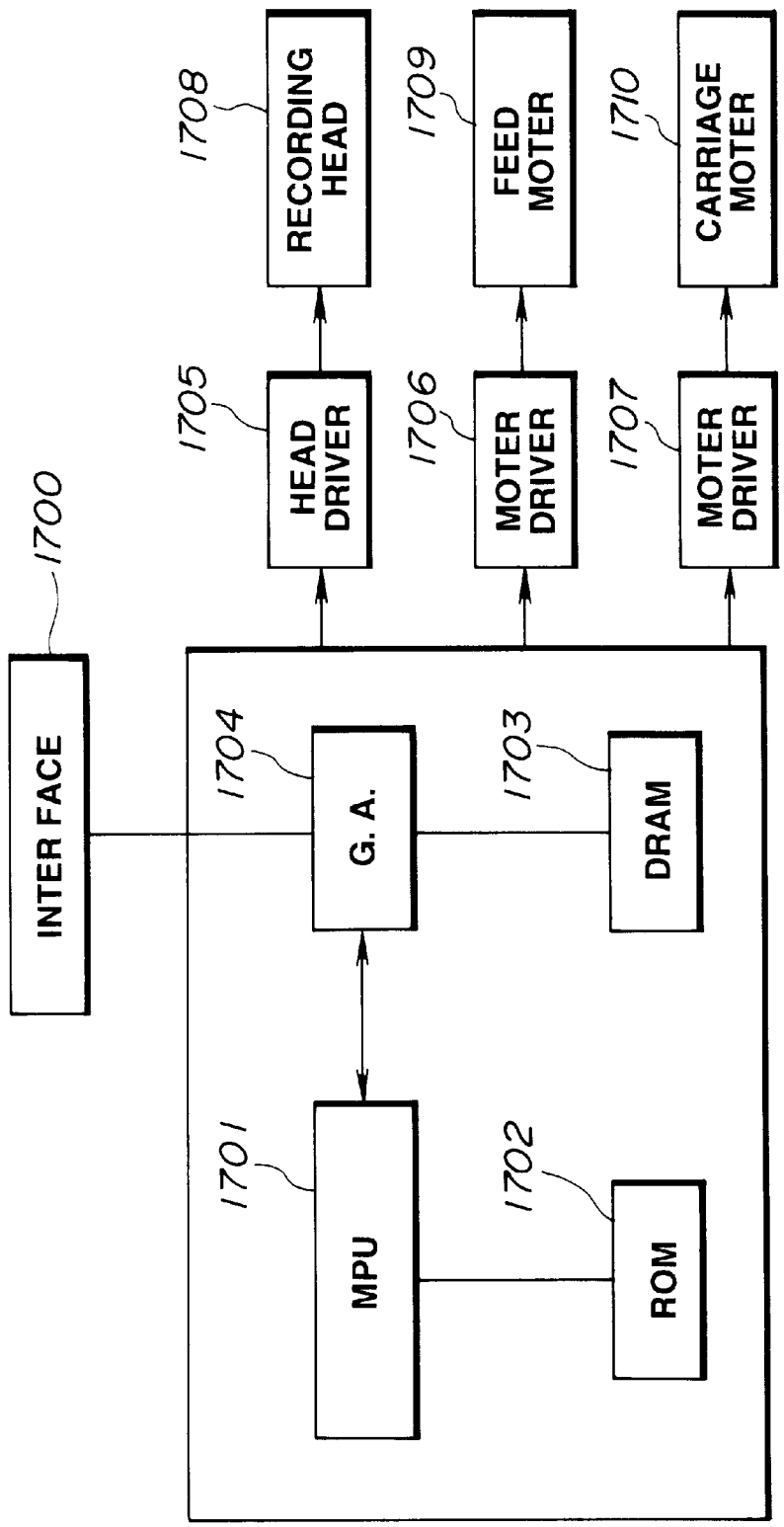
FIG. 2 is a block diagram showing structure of a control circuit of the ink jet recording apparatus of FIG. 1.

The control structure to perform recording control of the above mentioned apparatus will now be explained. FIG. 2 is a block diagram showing a structure for controlling the ink jet recording apparatus shown in FIG. 1. Referring to FIG. 2, reference numeral 1700 represents an interface through which recording signals are received, 1701 represents an MPU, 1702 represents a ROM for storing a control program to be executed by the MPU 1701, printing information supplied from a host computer so as to be printed and the like, and reference numeral 1703 represents a DRAM which corresponds to RAM 13 of FIG. 4 for storing a variety of data items (the foregoing recording signals and data to be supplied to the recording head so as to be recorded and the like).

Figure 4:
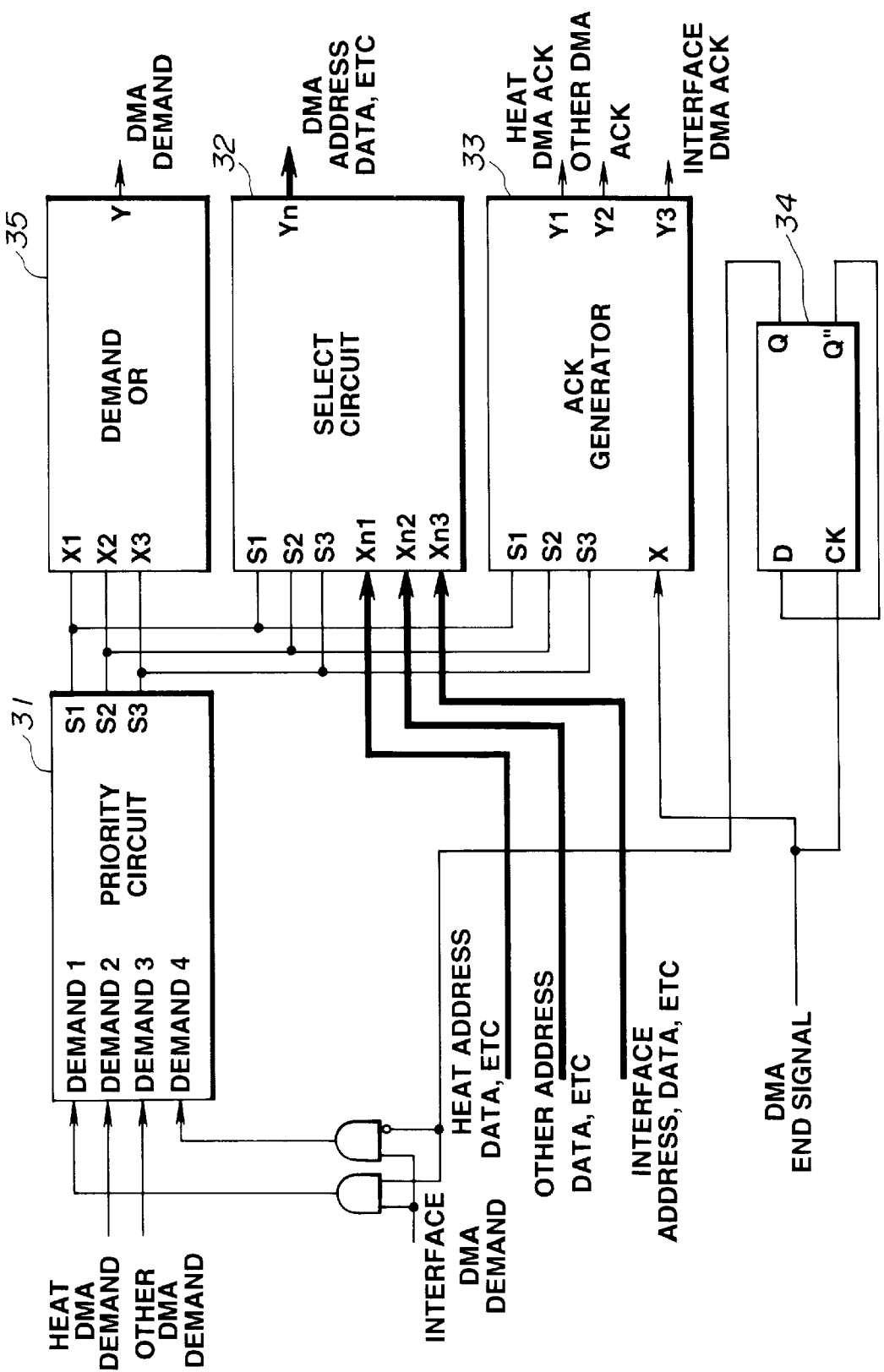
FIG. 4 is a block diagram showing detailed structure of the DMA controller shown in FIG. 3.

Reference numeral 1704 represents a gate array which includes the structure of FIG. 4 for controlling supply of data to be transmitted to a recording head 1708, the gate array 1704 also controlling data transfer among the interface 1700, the MPU 1701 and the DRAM 1703. Reference numeral 1710 represents a carrier motor for moving the recording head 1708. Reference numeral 1709 represents a feed motor for feeding recording paper, and 1705 represents a head driver for operating the recording head 1708. Reference numeral 1706 represents a motor driver for rotating the feed motor 1709. Reference numeral 1707 represents a motor driver for rotating the carrier motor 1710.

In the recording apparatus structured as described above, when information is supplied from a host computer through the interface 1700, the gate array 1704 and the MPU 1701 convert the supplied information into information to be printed out. As a result, the motor drivers 1706 and 1707 are operated, and as well, the recording head 1708 is operated in accordance with the information supplied to the head driver 1705 so that printing is performed.

<An explanation of DMA control section of MPU 1701 and gate array 1704>

Figure 3:
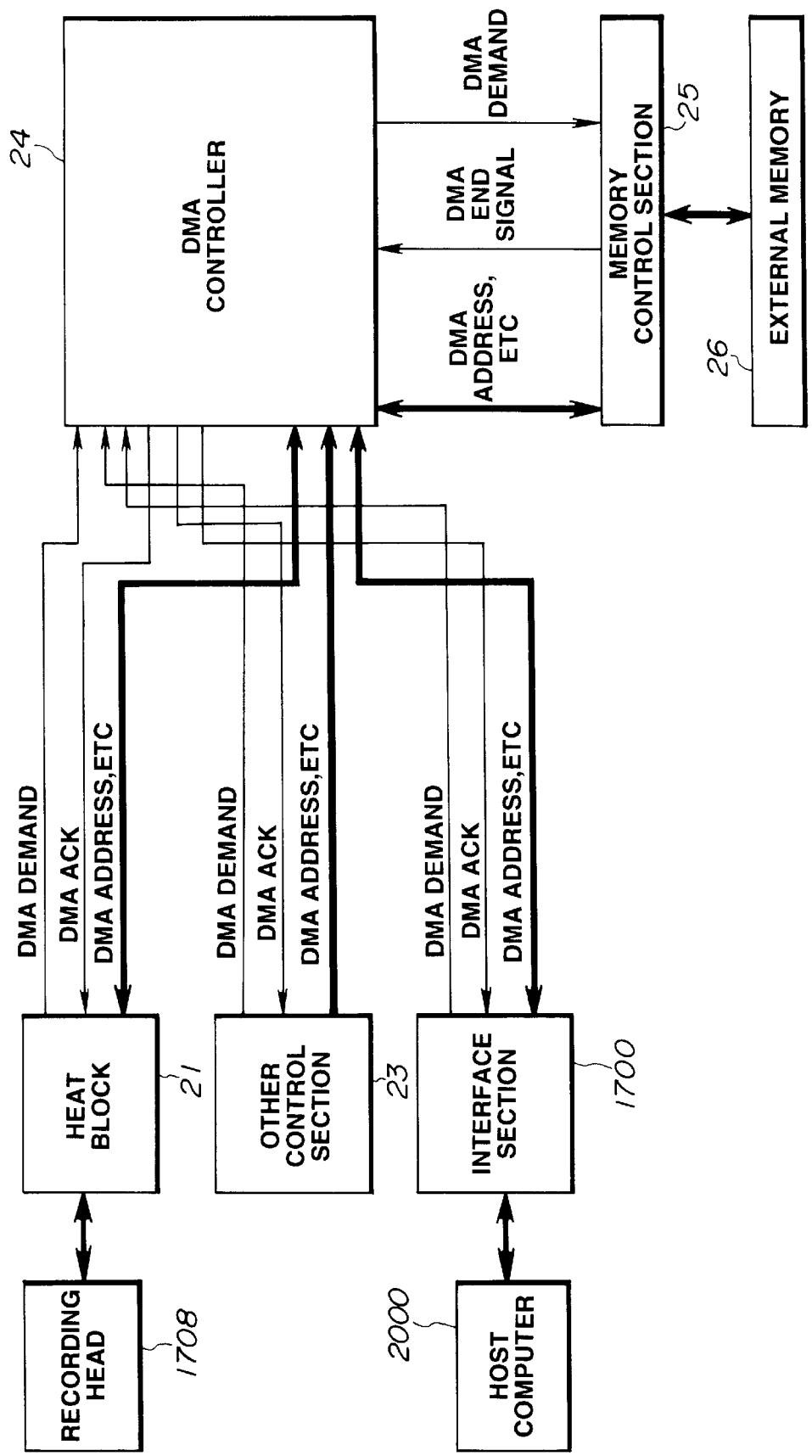
FIG. 3 is a block diagram showing structure which performs DMA control of one embodiment of the present invention.

The structure of the DMA control section in the MPU 1701 and the gate array 1704 in FIG. 2 is shown in FIG. 3.

Figure 5:
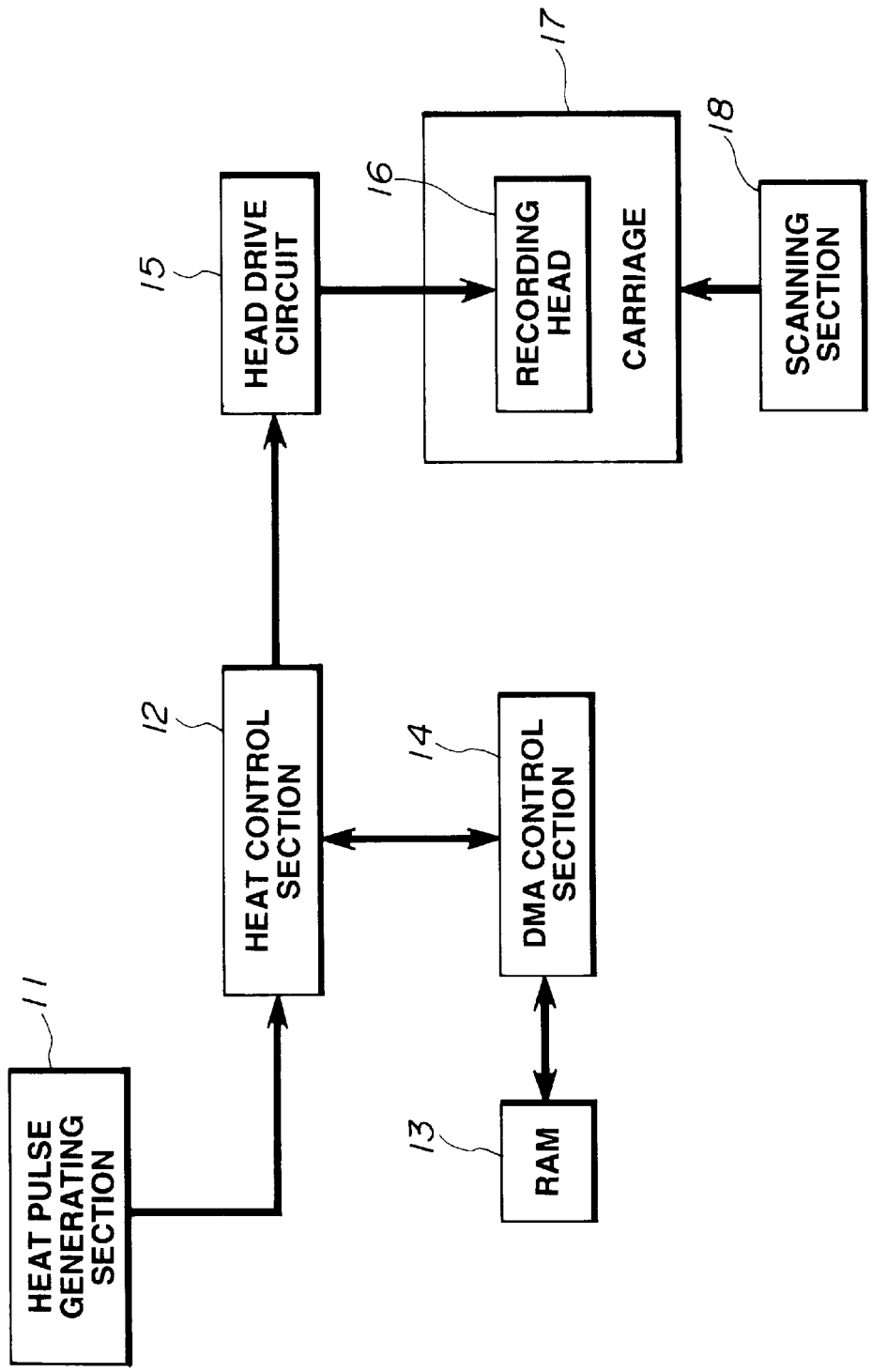
FIG. 5 is a block diagram showing a conventional example of DMA process during printing.

Certain details of this embodiment will be explained using FIG. 3. In that FIG., reference character 21 is the heat block which drives recording head 1708 (the head 16 in FIG. 5), and which includes the pulse generating section 11, the heat control section 12, the head drive circuit 15 and so on which are substantially as shown in FIG. 5. When heat data is needed, the heat block 21 sends the DMA demand signal with an address to the DMA controller 24 and then receives the DMA data with a DMA ACK signal from the DMA controller 24. Reference character 1700 in FIG. 3 is the interface section which administers the bidirectional Centronics interface. When DMA transfer is necessary in data transmission to the host computer 2000, the interface section 1700 sends the DMA demand signal with the address to the DMA controller 24, and receives the DMA data with a DMA ACK signal from the DMA controller 24. Moreover, when DMA transfer is necessary in data reception, the interface section 1700 sends a DMA demand signal and DMA transfer data with the address to the DMA controller 24, and then recognizes the end of DMA transfer by receiving the DMA ACK signal from the DMA controller 24.

Reference character 23 is any other control section which needs DMA transfer and which, when DMA transfer is necessary, mutually exchanges data with the DMA controller 24, including a DMA demand signal and the DMA ACK signal with the address, similarly. Reference numeral 24, as mentioned is the DMA controller which decides DMA to be performed next based on DMA demand signals from each peripheral block and their priorities. DMA controller 24 selects address and data in some cases based on decided priority, and sends a memory access demand by DMA and a DMA address, and in some cases DMA data, to the memory control block 25. And, receiving the DMA end signal from the memory control block 25, the DMA controller 24 generates the DMA ACK signal or in some cases data with the DMA ACK signal to suitable peripheral. In this embodiment, the initial order of DMA priorities is: HEAT DMA, other DMA, and Centronics interface DMA (in order of decreasing priority).

Reference numeral 25 is a memory access block which administers control of ASIC extended memory 26. The memory access block 25 has functions to generate a chip selection signal, an address and, in some cases, data for supplying to a suitable memory IC based on a memory access demand from the MPU 1701 or a memory access demand from the DMA controller 24, and to receive data from the memory IC, and so on.

<Detailed explanation of DMA controller>

Detailed circuit structure of DMA controller 24 is shown in FIG. 4. In that FIG., reference numeral 31 is the priority circuit to decide DMA priority. The priority circuit 31 generates a select signal for an address of DMA, data, and the DMA ACK signal corresponding to the DMA demand whose priority is highest among the DMA demands currently awaiting action (wherein the order of priorities is demand 1, demand 2, demand 3, demand 4 in order of decreasing priority). Reference numeral 32 is a select circuit which selects the address and data to be supplied to the memory control 25 based on the select signal from the priority circuit 31. In FIG. 4, either the HEAT address and data from the heat block 21, or other addresses and data from other control section 23, or a Centronics address and data from the interface 1700, are selected to be output.

Reference numeral 33 is an ACK generating circuit which generates the DMA ACK signal. The ACK generating circuit 33 generates the DMA ACK signal to whichever block is designated by the priority circuit 31 when it receives the DMA end signal from the memory control block 25. Reference numeral 34 is a D-type flip-flop circuit whose output Q repeats set/reset (H, L, H, L, . . . ) every time a DMA end signal from the memory control block 25 arrives. The output Q of the flip-flop circuit 34 is fed back to the priority circuit 31, and the output Q sets the priority of Centronics interface DMA demand as demand 1 or demand 4. The Centronics interface DMA thus alternates, at every DMA, between high priority and low priority, i.e., a priority of demand 1 level, a priority of demand 4 levels, a priority of demand 1 level, a priority of demand 4 levels, etc. (as shown in FIG. 6).

Reference numeral 35 is an OR circuit. When either DMA demand comes, the OR circuit sums the DMA demand by logical add to output as the DMA demand signal.

Figure 6:
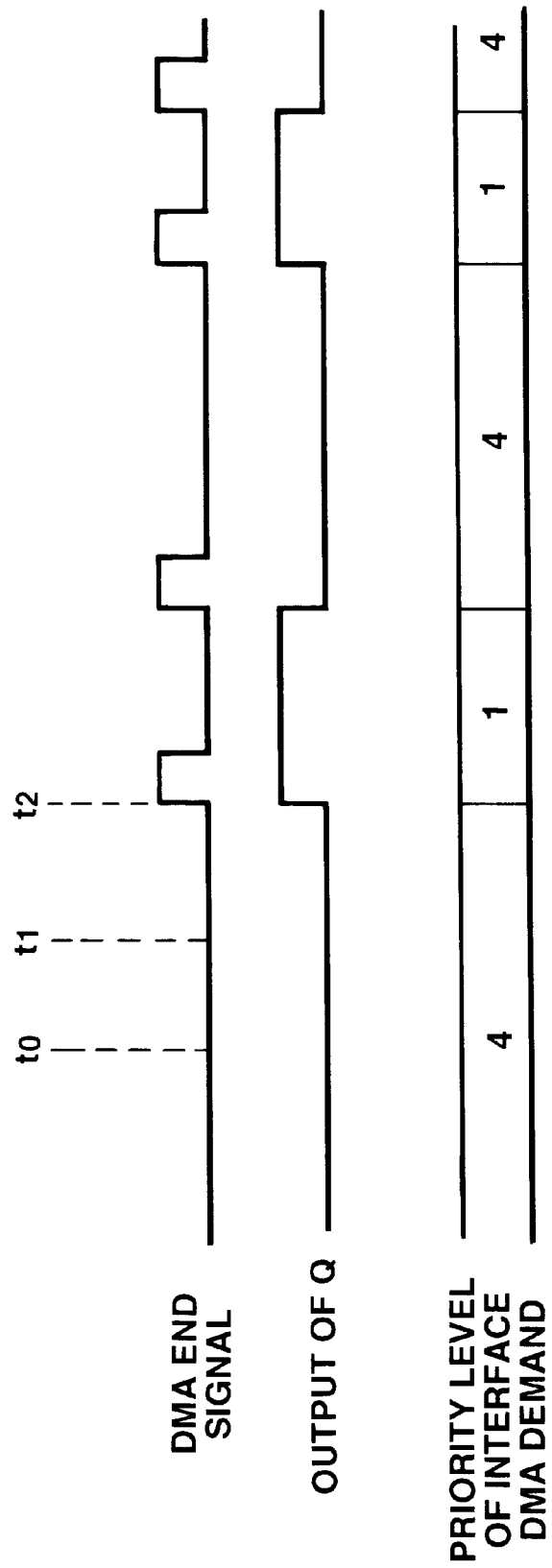
FIG. 6 is a timing chart showing an operation of the embodiment.

FIG. 6 shows a timing chart of the DMA controller 24. Initially, the level of interface DMA demand is 4, as mentioned above. At timing t1, when an interface issues a DMA demand, if there are no other DMA demands, interface DMA will be performed irrespective of priority. If other DMA demands are awaiting action and the DMA demands compete with each other, however, the interface DMA demand must wait. For example, if another DMA demand, e.g., a heat DMA demand, issues at timing t0 that other DMA demand will be performed at that time. When that other DMA process ends, at time t2, since the priority of the interface DMA now rises to level 1, the interface DMA will be certainly carried out at time t2. Here, since the time which is required in DMA process is on the order of nanoseconds, generally, while the Max time of the Centronics interface standard is on the order of milliseconds, the interface DMA will be performed early within the Max time (although other embodiments within the scope of the invention may provide time-periods of other lengths for various types of DMA).

According to this embodiment, thus, the priorities of different DMA demands are not fixed, but can be changed, e.g., alternately or in any other desired pattern. By virtue of this feature, in an apparatus in which a process in a predetermined interval, such as the DMA for heat control for the heat block 21, is indispensable, it is possible to support the bidirectional Centronics interface standard perfectly without hindering DMA control.

The illustrated embodiment thus can prevent the priority assigned to interface DMA becoming, or remaining, unnecessarily high.

In the above embodiment, the priority of interface DMA is changed at the end of every DMA process. However, the present invention is not limited to the details of that embodiment. For example, Max time is defined in some modes in the bidirectional Centronics standard, and accordingly, the priority may be changed by judging whether a particular DMA demand is a DMA demand of one of those specific modes or not. Since data transfers in the ECP mode (for example) involve the movement of massive amounts of data, it may be especially convenient to regard the ECP mode as such specific mode (command).

Further, the present invention may be applied to a system comprising plural apparatuses, or it may be applied to a single apparatus.

As mentioned above, according to the present invention, in a case of sending and receiving recording information by means of DMA, an output unit which can certainly respond within a time equal to or less than the Max value of response time of the bidirectional Centronics standard, while smoothly performing other DMA, can be provided.

Typical structures and operational principles of such devices to which the present invention can be applied, can preferably be such as those disclosed in U.S. Pat. Nos. 4,723,129 and 4,740,796. Those principles and structures are applicable to a so-called on-demand type recording system and to a continuous type recording system, but are particularly suitable for the on-demand type. Such an approach, that is, adopts the principle that at least one driving signal is applied to an electrothermal transducer disposed on a liquid (ink) retaining sheet or in a liquid passage, the driving signal being sufficient to provide a quick temperature rise beyond a departure-from-nucleation boiling point. The thermal energy provided by the electrothermal transducer produces film boiling on the heating portion of the recording head, whereby a bubble can be formed in the liquid (ink), in response to each driving signal. The production, development and contraction of the bubble cause ejection of the liquid (ink) through an ejection outlet to produce at least one droplet. The driving signal is preferably in the form of a pulse, because this enables the development and contraction of the bubble to be effected instantaneously, and therefore, the liquid (ink) is ejected with quick response to the driving signal. The pulse-shaped driving signal is preferably formed as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600, wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984, wherein a common slit is used as the ejection outlet for plural electrothermal transducers, and to the structure disclosed in Japanese Laid-Open Patent Application No. 138461/1984, wherein an opening for absorbing pressure waves of the thermal energy is formed corresponding to the ejecting portion. This is because the present invention is effective to perform recording with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

Provision of the recovery means and/or the auxiliary means for the preliminary operation is preferable, because those features can further stabilize the effects of the present invention. Examples of such means include a capping means for the recording head, cleaning means therefor, pressing or sucking means for keeping the ink ejection outlets or orifices clean, preliminary heating means (which may be an electrothermal transducer, an additional heating element or a combination thereof). Also, means for effecting preliminary ejection (to precede the actual recording operation) can stabilize the recording operation.

The recording head may be a single head which records using a single color ink, or may be plural heads corresponding to plural ink materials having different recording colors or densities. The present invention is effectively applied to an apparatus having at least one of a monochromatic mode (using black ink, most commonly), a multi-color mode using different color ink materials, and/or a full-color mode using a mixture of colors, which may be an integrally-formed recording unit or a combination of plural recording heads.

Furthermore, in the foregoing embodiments, the ink has been described as being liquid. It also may be an ink material which is solid below room temperature but liquid at room temperature. Since the ink is kept within a temperature range between 30° C. and 70° C., in order to stabilize the viscosity of the ink to provide stabilized ejection in the usual recording apparatus of this type, the ink may be such that it is liquid within that temperature range, whatever its phase outside that range. With one type of ink, temperature rise due to the thermal energy is positively prevented by consuming that energy for the state change of the ink from the solid state to the liquid state. Another ink material solidifies when it is left undisturbed for a certain time, thus preventing evaporation of the ink. In either of these cases, in response to application of the recording signal producing thermal energy, the ink liquefies, and the liquefied ink can be ejected. Another usable ink material may be one that starts to solidify upon reaching the recording material.

The present invention is also applicable to ink materials that are liquefied by application of thermal energy. Such an ink material may be retained as a liquid or solid material in through-holes or recesses formed in a porous sheet, as disclosed in Japanese Laid-Open Patent Application No. 56847/1979 and Japanese Laid-Open Patent Application No. 71260/1985. The sheet is arranged facing the electrothermal transducers. The most effective one of the techniques described above is the film boiling system.

The ink jet recording apparatus may be used as an output terminal of an information processing apparatus such as a computer or the like, as a copying apparatus when combined with an image reader or the like, or as a facsimile machine having information sending and receiving functions.

The entire disclosures of U.S. Pat. Nos. 4,740,796, 4,723,129, 4,558,33, 4,463,359, 4,459,600 and 4,345,262, and those of Japanese Laid-Open Patent Applications Nos. 56847/1979, 123670/1984, 138461/1984 and 71260/195, are incorporated herein by reference.

While the invention has been described with reference to the preferred structures disclosed herein, it is not confined to the details set forth above; to the contrary, many modifications and variations thereof will be readily apparent to those skilled in the art, and this application is intended to cover all such modifications or changes as may come within the purposes of the disclosed improvements disclosed above, within the scope of the following claims.

What is claimed is:

1. A recording apparatus for use with a host apparatus which supplies recording information, the recording apparatus receiving recording information from the host apparatus by direct memory access and printing the received recording information by means of a recording head, said recording apparatus comprising:
    a memory;
    a first memory access circuit, for effecting direct memory access between the host apparatus and said memory to cause said memory to receive the recording information from the host apparatus by direct memory access responsive to a first access demand;
    a second memory access circuit, for effecting direct memory access between said memory and the recording head to cause the recording head to receive the recording information from said memory by direct memory access, with a timing appropriate for recording, responsive to a second access demand;
    a priority circuit, responsive to the first and second access demands, for defining priorities with which access shall be permitted respectively to said first and second memory access circuits;
    a priority control circuit for dynamically changing, within a predetermined time interval, the priorities defined by said priority circuit, wherein the predetermined time interval is based on the maximum time it takes to acknowledge the first access demand; and
    an interface circuit for transfer ring recording information between said recording apparatus and the host apparatus, wherein said first memory access circuit receives recording information from the host apparatus via said interface circuit, and wherein said interface circuit transfers recording information bidirectionally.

2. An apparatus according to claim 1, wherein said priority control circuit changes the priorities after every n memory accesses, where $n \geq 1$.

3. An apparatus according to claim 2, wherein said priority control circuit changes the priorities at the end of each direct memory access.

4. An apparatus according to claim 1, wherein said priority control circuit changes the priorities responsive to the first access demand being in a predetermined mode.

5. An apparatus according to claim 1, wherein the maximum time is on the order of milliseconds.

6. An apparatus according to claim 1, wherein the process time which is required in said first and second memory access circuits is on the order of nanoseconds.

7. An apparatus according to claim 1, wherein said second memory access circuit supplies the received recording information to the recording head periodically.

8. An apparatus according to claim 1, further comprising a scanning section for scanning the recording head across a surface of a recording medium, wherein said second memory access circuit supplies the received recording information to the recording head in coordination with the scanning of the recording head.

9. An apparatus according to claim 1, further comprising the recording head, and wherein said recording head effects recording by discharging a recording liquid.

10. An apparatus according to claim 9, wherein said recording head discharges the recording liquid by using thermal energy.

11. An apparatus according to claim 1, comprising a plurality of such recording heads, wherein said recording heads record in different respective colors from each other.

12. An apparatus according to claim 1, wherein said recording apparatus is constructed to be used as a terminal for a computer.

13. An apparatus according to claim 1, further comprising an image scanner connected to provide image data to be recorded by the recording head, such that said recording apparatus can function as a copying machine.

14. An apparatus according to claim 1, further comprising an image scanner connected to provide image data and a data transmitting and receiving unit for transmitting the image data to a recipient at another location and for receiving image data from another machine, such that said recording apparatus can function as a facsimile machine.

15. An apparatus according to claim 1, further comprising transport means for transporting a recording medium onto which the image formed by the recording head is recorded.

16. A recording apparatus for use with a host apparatus which supplies recording information, the recording apparatus receiving recording information from the host apparatus by direct memory access and printing the received recording information by means of a recording head, said recording apparatus comprising:
    memory means for storing the recording information;
    first memory access means for effecting direct memory access between the host apparatus and said memory means to cause said memory means to receive the recording information from the host apparatus by direct memory access responsive to a first access demand;
    second memory access means for effecting direct memory access between said memory means and the recording head to cause the recording head to receive the recording information from said memory means by direct memory access, with a timing appropriate for recording, responsive to a second access demand; and
    memory access control means, responsive to the first and second access demands, for defining priorities with which access shall be permitted respectively to said first and second memory access means based on priorities of direct memory accesses in said first and second memory access means wherein said memory access control means dynamically changes between said first and second states within a predetermined time interval, wherein the predetermined time interval is based on the maximum time it takes to acknowledge the first access demand; and an interface circuit for transferring recording information between said recording apparatus and the host apparatus, wherein said first memory access circuit receives recording information from the host apparatus via said interface circuit, and wherein said interface circuit transfers recording information bidirectionally.

17. An apparatus according to claim 16, wherein said memory access control means changes the priorities upon each nth memory access, where $n \geq 1$.

18. An apparatus according to claim 17, wherein said memory access control means changes the priorities at the end of each direct memory access.

19. An apparatus according to claim 16, wherein said memory access control means changes the priorities based on a predetermined mode in which the first access demand is effected.

20. An apparatus according to claim 16, wherein said first memory access means contains an interface circuit for transferring the recording information between said recording apparatus and the host apparatus, and wherein said first memory Access means receives the recording information via said interface circuit.

21. An apparatus according to claim 20, wherein said interface circuit transfers recording information bidirectionally.

22. An apparatus according to claim 16, wherein said second memory access means supplies the received recording information to the recording head periodically.

23. An apparatus according to claim 16, further comprising scanning means for scanning the recording head across a surface of a recording medium, wherein said second memory access means supplies the received recording information to the recording head in coordination with the scanning of the recording head.

24. An apparatus according to claim 16, further comprising the recording head, and wherein said recording head effects recording by discharging a recording liquid.

25. An apparatus according to claim 24, wherein the recording head discharges the recording liquid by using thermal energy.

26. An apparatus according to claim 16, comprising a plurality of such recording heads, wherein said recording heads record in different respective colors from each other.

27. An apparatus according to claim 16, wherein said recording apparatus is constructed to be used as a terminal for a computer.

28. An apparatus according to claim 16, further comprising an image scanner connected to provide image data to be recorded by the recording head, such that said recording apparatus can function as a copying machine.

29. An apparatus according to claim 16, further comprising an image scanner connected to provide image data and a data transmitting and receiving unit for transmitting the image data to a recipient at another location and for receiving image data from another machine, such that said recording apparatus can function as a facsimile machine.

30. An apparatus according to claim 16, further comprising transport means for transporting a recording medium onto which the image formed by the recording head is recorded.

31. An apparatus according to claim 16, wherein the maximum time is on the order of milliseconds.

32. An apparatus according to claim 16, wherein the process time which is required in said first and second memory access circuits is on the order of nanoseconds.

33. An apparatus according to claim 1, further comprising a third memory access means for effecting direct memory access to said memory by direct memory access responsive to a third access demand.

34. An apparatus according to claim 16, further comprising a third memory access means for effecting direct memory access to said memory by direct memory access responsive to a third access demand,
wherein said memory access control means defines a constant priority of access of said second access demand responsive to said third access demand.

* * * * *

UNITED STATES PATENT AND TRADEMARK OFFICE
CERTIFICATE OF CORRECTION

PATENT NO. : 6,128,676
DATED : October 3, 2000
INVENTOR(S) : CHIKATOSHI OHKUBO

It is certified that error appears in the above-identified patent and that said Letters Patent is hereby corrected as shown below:

<u>IN THE COVER PAGE [54] Title</u>:

"CHANGES" should read --CHANGING--;

Col. 1, line 3, "CHANGES" should read --CHANGING--;

Col. 10, line 65, "deamnd; and" should read --demand--;

Col. 11, line 30, "Access" should read --access--;

Col. 12, line 6, "comprising" should read --further comprising--

Signed and Sealed this

Twenty-second Day of May, 2001

Attest:

NICHOLAS P. GODICI

Attesting Officer

Acting Director of the United States Patent and Trademark Office